United States Patent [19]

Ookawa

[11] Patent Number: 4,858,029
[45] Date of Patent: Aug. 15, 1989

[54] VIDEO RECORDER WITH FIELD MEMORY

[75] Inventor: Katsuhiro Ookawa, Nagaokakyo, Japan

[73] Assignee: Mitsubishi Denki Kabushiki Kaisha, Tokyo, Japan

[21] Appl. No.: 66,547

[22] Filed: Jun. 26, 1987

[30] Foreign Application Priority Data

Jun. 26, 1986 [JP] Japan ............................. 61-151233
Jun. 26, 1986 [JP] Japan ............................. 61-151234

[51] Int. Cl.⁴ .......................................... H04N 5/782
[52] U.S. Cl. .................................. 358/340; 360/10.3; 360/33.1
[58] Field of Search ................... 360/10.1, 10.2, 10.3, 360/33.1, 29, 36.1, 27; 358/335, 336, 340, 328; 369/32, 33

[56] References Cited

U.S. PATENT DOCUMENTS 4,418,366 11/1983 Moriya ......................... 360/10.2 X

FOREIGN PATENT DOCUMENTS 0149566 7/1985 European Pat. Off. .
0181942 5/1986 European Pat. Off. .
2646899 3/1985 Fed. Rep. of Germany .
60-37890 2/1985 Japan .
2160066 12/1985 United Kingdom .

Primary Examiner—Robert L. Richardson
Attorney, Agent, or Firm—Birch, Stewart, Kolasch & Birch

[57] ABSTRACT

A video reproducing apparatus is provided for reproducing at a high speed a video signal from a recorded magnetic tape with the use of a field memory for storing video signal in which the writing in and reading out timing of the video signal for the field memory is changed in accordance with the variation of the envelope signal of the video signal extracted by an envelope detector.

10 Claims, 10 Drawing Sheets

← forward direction

|←— 1 field period —→|

forward direction

VIDEO RECORDER WITH FIELD MEMORY

BACKGROUND OF THE INVENTION

The present invention relates to video reproducing or playback apparatus, and more particularly to such apparatus which is capable of obtaining a high quality of reproduced image without noise bars at a high reproduction speed.

High speed reproduction in a video tape recorder (hereinafter referred to as "VTR") using a field memory will be described where it is driven at an even numbered multiple of the recording speed i.e. m times normal speed, where m is an even number and equal to, for example, four.

Generally, an odd numbered multiple or n times normal speed, wherein is an odd number, is used for high speed reproduction so as to utilize the property that the positions of noise bars are fixed due to the fact that the position of the noise of every field is the same. On the contrary, when the signal reproduction is conducted at m normal speed, the positions of the noise and the signal are replaced by each other at every field. If this property is utilized in using a memory, it becomes possible to narrow the noise bar.

Figure 1:
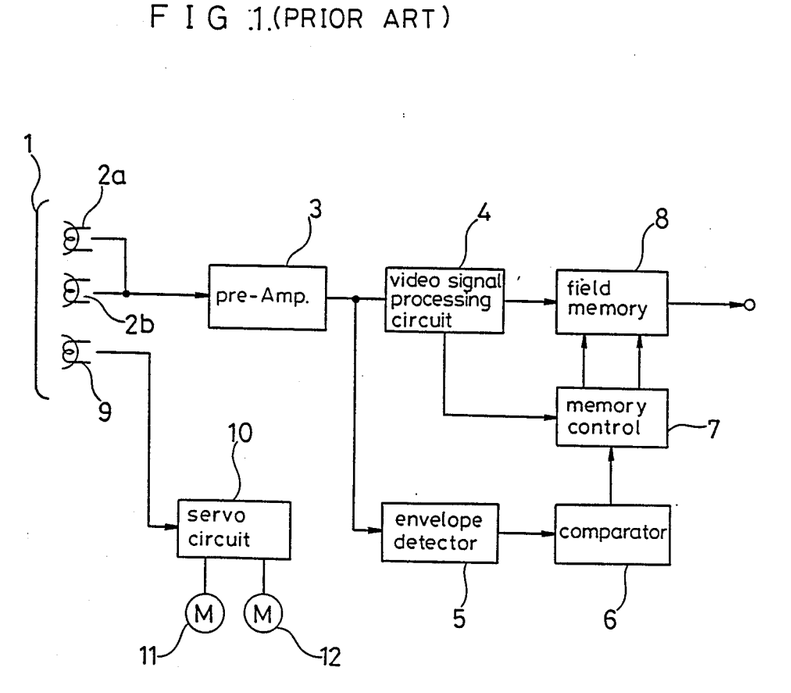
FIG. 1 is a block diagram showing the construction of a prior art video reproducing apparatus.

FIG. 1 is illustrative of a high speed playback system of a typical prior art VTR. In FIG. 1, the reference numeral 1 designates a video tape onto which signals are recorded. The signals reproduced from the video tape 1 by the video heads 2a and 2b are applied to the preamplifier 3, and thereafter, the reproduced signals are fed to the video signal processing circuit 4. Reference numeral 5 designates an envelope detector for detecting the envelope of the reproduced signal from the output of the preamplifier 3. The output of the envelope detector 5 is connected to the comparator 6 which compares the same with a predetermined level, and the output thereof is coupled to the memory control circuit 7 which generates timing and the address signals for the writing in of the output signal which is output from the video signal processing circuit 4 to a field memory 8. A signal is sent to the memory control circuit 7 from the video signal processing circuit 4.

The field memory 8 is a dualport memory or a multi-port memory (not shown). This memory has a random output port and a serial output port as output ports; and if the serial port is used, the writing in and the reading out from the memory can be conducted asynchronously. The operations herewith are conducted asynchronously in such a manner that the reproduced signal from the video signal processing circuit 4 is written in into the field memory 8 and the content of the field memory 8 is then read out with the use of the serial port.

Further, reference numeral 9 designates a control head, and on the basis of the output of the control head 9 the servo circuit 10 conducts the running control of the tape in each operational mode by controlling the capstan motor 11 and the reel motor 12.

The device operates as follows.

Figure 2:
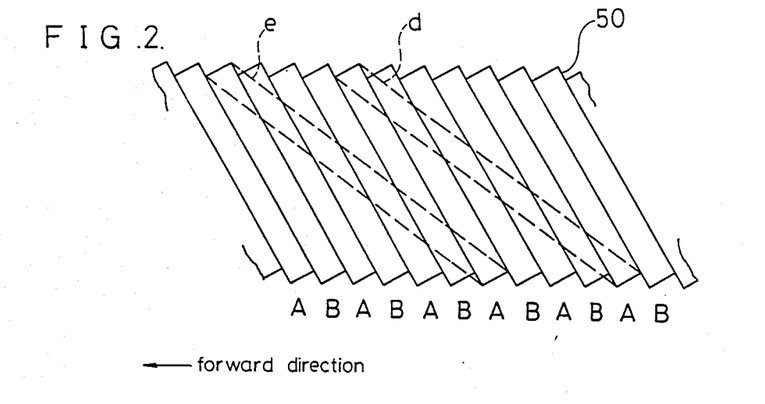
FIG. 2 is a diagram showing the head locus for the case where a guardbandless recorded video track is reproduced at a high speed.
Figure 3:
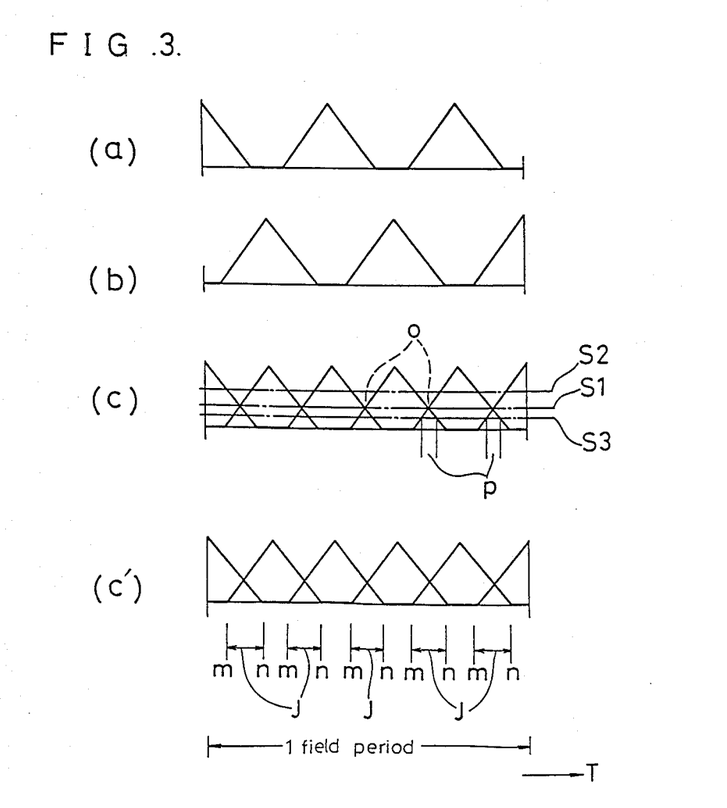

Assume now that a high speed reproduction of playback of the video tape 1 is provided at a speed of four times (m=4) the normal speed in the reverse direction. FIGS. 2 and 3 are diagrams for exemplifying such operation. In FIG. 2, reference numeral 50 designates a video track, and reference characters A and B represent the azimuth recordings. The video head 2a (FIG. 1) has the same azimuth as A and the video head 2b has the same azimuth as B, respectively.

When the video head 2a traces the locus of the dotted lines d in the drawing, the reproduced signal, that is, the output of the preamplifier 3 appears as shown in FIG. 3(a). Similarly as above, when the video head 2b traces the locus of the dotted lines e in the drawing, an output as shown in FIG. 3(b) is obtained. When the contents of the two fields as illustrated in FIGS. 3(a) and 3(b) are mutually interlaced on the time axis, a video image of one field as shown in FIGS. 3(c) and 3(c') is obtained, and this is stored in the field memory 8 and displayed on a monitor. Herein, the envelope waveforms shown in FIGS. 3(a), 3(b), 3(c), and 3(c') indicate only the upper portions of the alternate waveform which has symmetrical configurations at the upper and lower portions.

Such a one field content having substantially no noise bar is obtained in a case where the width of the video track is approximately equal to or larger than the width of the magnetic head with no guardband. Actually, in apparatus having a head construction which utilizes both the standard mode and the triple speed mode in a VHS system, the construction of the head is mainly directed to a triple speed mode use.

Figure 4:
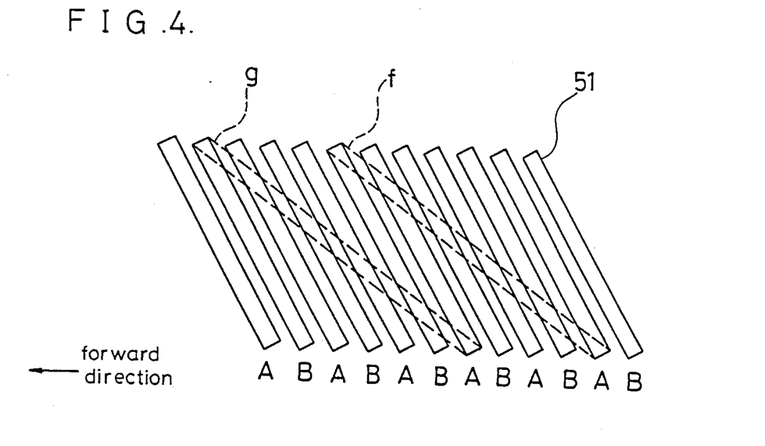
FIG. 4 is a diagram showing the head locus for the case where a with guardband recorded video track is reproduced at a high speed.

When a standard mode recording is conducted in such apparatus, a portion of ½ to ⅔ of the video track 50 becomes a guardband, and the video track becomes as shown by reference numeral 51 in FIG. 4. The output of the preamplifier 3, obtained by tracing the loci of the dotted lines f and g by the respective video heads 2a and 2b on the video track 51, becomes as shown in FIGS. 5(a) and 5(b), respectively, and one field video image is obtained when these are mutually interpolated on the time axis becomes as shown in FIG. 5(c).

Figure 5:
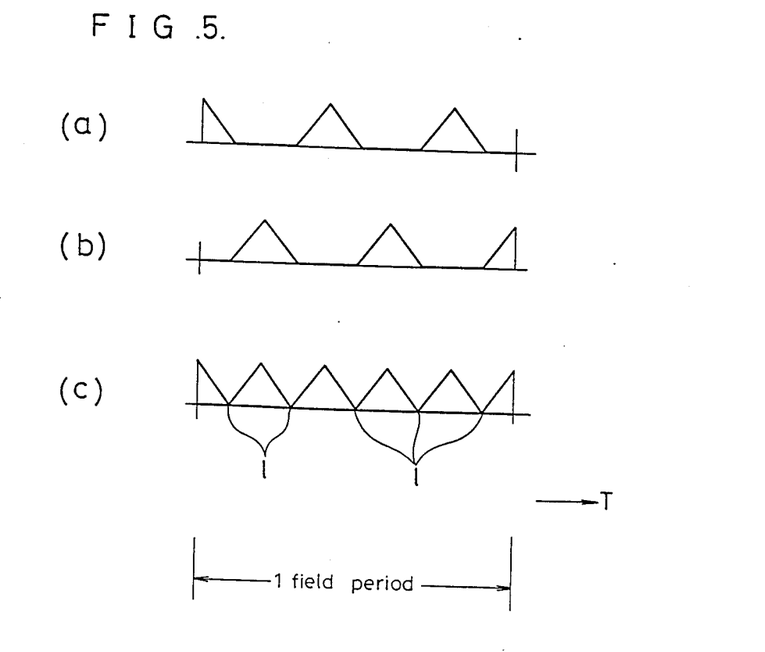

Accordingly, when the video image is interlaced on the time axis shown in FIGS. 3(c) and 3(c'), and the waveform of FIG. 5(c) is written in into the field memory 8, the comparison voltage of the comparator 6 must be changed. That is, in FIG. 3(c), if the comparison voltage of the comparator 6 comprises the level of S1, only that portion for which a signal is obtained is written in into the field memory 8 at every field. This is an ideal state, and the composite video information interlaced within one field period continue smoothly. On the other hand, if the level is at the level S2, a reproduced signal is not obtained for the portion 0 and appears as a noise region. Similarly, if the level is fixed to the level S3 the content of the portion P is rewritten at every field, and it appears as a blur. Furthermore, if the comparison voltage of the comparator 6 is made a "0" level in FIG. 5(c), almost all of the envelope is written in into the field memory 8. Herein, although the signal to noise ratio or S/N is low and there appears a noise region having a noise width of some degree at the portion designated by l, the interlaced video information continues smoothly thereat because it is almost impossible to obtain a signal information thereat.

In FIG. 3(c'), however, when zero voltage is applied to the comparator 6 similarly as above, the portion designated by J appears as a blur because the content thereof is rewritten at every field, and the noise which arises accompanying the deterioration of S/N appear in the vicinity of the both ends m and n of J. That is, two noise bars having noise widths of some degree appear at a portion where only a noise bar having quite a small width (one horizontal scanning period) originally appeared. That is, in FIGS. 2 and 4 the recording track width on the tape are different from each other, and if the same comparison reference voltage is used, the number and the noise width of the noise bars will have different values.

As described above, in a device which effects high speed reproduction at m times normal speed, where m is an even number, with the use of a field memory and provides interlacing of the content of each field to obtain signal information, a problems arises in that the number of noise bars is increased and the width of the noise bars is widened dependent on the level variation of the reproduced signal which is reproduced from the tape or is widened dependent on the recording track width on the tape.

SUMMARY OF THE INVENTION

An object of the present invention is, therefore, to provide a video tape recording and/or reproducing apparatus capable of suppressing noise bars automatically while obtaining a high quality image.

A second object of the present invention is to provide an improved video tape playback apparatus capable of minimizing the number and the width of the noise bars of the reproduced signal fed from a field memory and providing a high quality video image even in a case where variations arise in the level of the signal reproduced from the tape.

A third object of the present invention is to provide an improved video tape playback or reproducing apparatus capable of minimizing the number and the width of the noise bars of the reproduced signal outputted from a field memory and capable of providing a high quality video signal even in the event where the recording track widths on the tape are different.

Other objects and advantages of the present invention will become apparent from the detailed description provided hereinafter. It should be understood, however, that the detailed description and specific embodiment are given by way of illustration only, since various changes and modifications within the spirit and scope of the invention will become apparent to those skilled in the art from this detailed description.

According to one aspect of the present invention, there is provided a video tape reproducing apparatus in which a reference signal voltage is supplied to a comparator and adjusting the reference signal level to a desired level on the basis of the envelope detection signal obtained from the reproduced signal.

According to another aspect of the present invention, there is provided a video tape reproducing apparatus in which the range of the reproduced signal is detected from an envelope signal which is obtained over a two field period with the use of such as a microcomputer including a field memory, and wherein operation is accomplished on the basis of the detected result to thereby control the optimum range for the writing in field information into the field memory.

BRIEF DESCRIPTION OF THE DRAWINGS

FIGS. 3(a)-3(c') comprise a set of waveforms showing the preamplifier output of the reproduced signal of FIG. 2;

FIGS. 5(a)-5(c) comprise a set of waveforms showing the preamplifier output of the reproduced signal of FIG. 4;

FIGS. 7(a)-7(d) comprise a set of waveforsm exemplifying the operation of the device of FIG. 6;

FIG. 9(a)-(d), is a set of signal waveforms exemplifying the operation of the device of FIG. 8;

FIGS. 11(a)-11(f) a set of waveforms showing the signal output from the preamplifier obtained when the signal is reproduced as shown in FIG. 10.

DETAILED DESCRIPTION OF THE PREFERRED EMBODIMENTS

In order to explain the present invention in detail, particular reference will now be made to FIG. 6.

Figure 6:
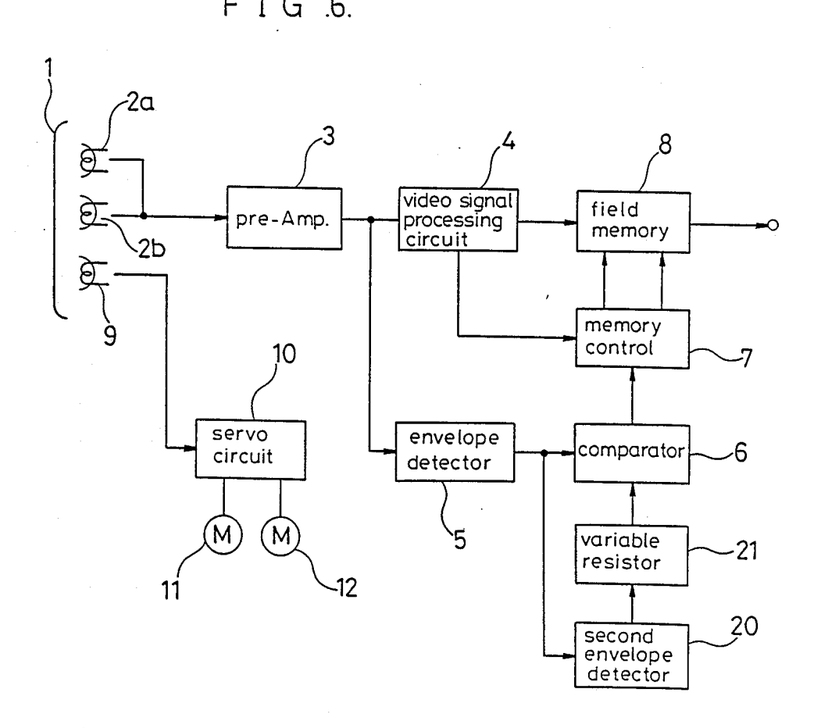
FIG. 6 is a block diagram showing the construction of a video reproducing apparatus according to one embodiment of the present invention.

In FIG. 6, reference numeral 20 designates a second envelope detector, which is designed to detect the output from the first envelope detector 5. Reference numeral 21 designates a variable resistor which generates a voltage there across establishing the level or amplitude of the output of the second envelope detector 20 which is supplied as a comparison voltage to the comparator 6. That is, the level of the comparison voltage to be supplied to the comparator 6 is established by these circuit elements. The other elements shown are the same as those of conventional apparatus, and the same reference numerals are used to designate the same elements as those of FIG. 1.

The device operates as follows.

Figure 7:
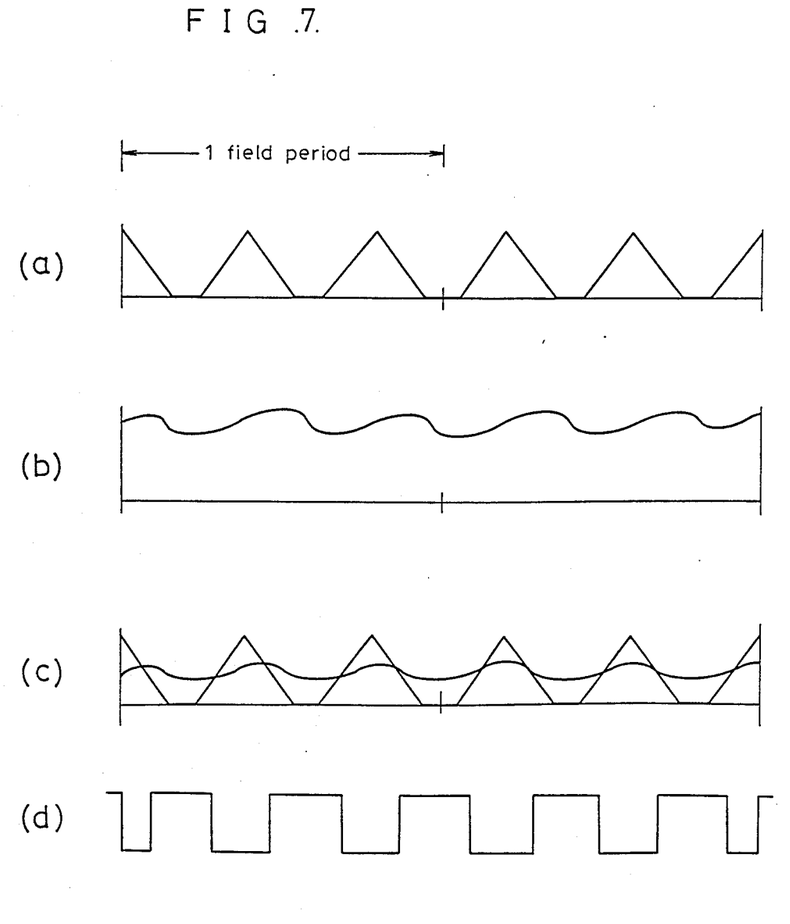

Now assume, for purposes of illustration, that the video heads 2a and 2b reproduce the loci e and d of the video track 50 of FIG. 2 on the video tape 1 in a reverse direction at four times normal speed, i.e. m=4. The reproduced envelope waveform obtained over two field periods from the output of the first envelope detector 5 then becomes the waveform as shown in FIG. 7(a). When the waveform in FIG. 7(a) is applied to the second envelope detector 20 an integrated waveform shown in FIG. 7(b) is obtained. This waveform obtained by integration is set at an appropriate level by the voltage across variable resistor 21, and is supplied to the comparator 6. This operation is shown in FIG. 7(c). That is, FIG. 7(c) shows the output of the first envelope detector 5 which is supplied to the comparator 6 and the output obtained from the second envelope detector 20 via the variable resistor 21. Herein, the output signal across from the variable resistor 21 is one which is adjusted so as to correspond to the optimum level S1 shown in FIG. 3(c).

The output from the comparator 6 becomes one in which the logic level is inverted at every field as shown in FIG. 7(d). Herein, the level "L" of the comparator output represents the writing in range to the field memory 8, and on the other hand the level "H" represents the reading out range. Herein, the word "reading out" means that writing in into the field memory 8 is not being conducted. That is, in the operation of the present invention a dual-port memory or a multi-port memory is used, and reading out is conducted asynchronously with writing in from the serial output port.

In the above-illustrated embodiment, level establishment is provided from the signal obtained by detecting the output of the first envelope detector 5, and if the variable resistor 21 is once adjusted, even if a level variation thereafter arises in the envelope signal, an optimum level is always supplied to the comparator 6.

A second embodiment of the present invention will now be described.

Figure 8:
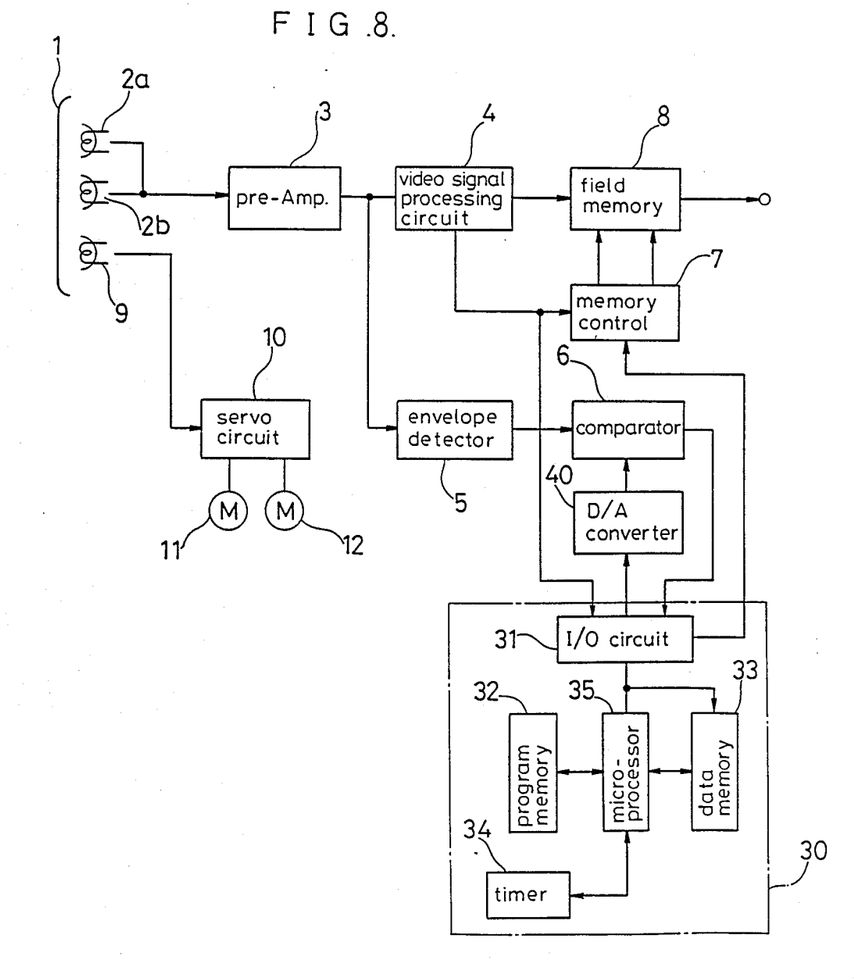
FIG. 8 is a block diagram showing the block construction of the video reproducing apparatus as another embodiment of the present invention.

In FIG. 8, reference numeral 30 designates a one chip microcomputer. This one chip microcomputer 30 comprises an I/O circuit 31 which is designed: to receive the synchronous signal from the video signal processing circuit 4 and the output from the comparator 6, to output an optimum voltage to the comparator 6 through the D/A converter 40, and further to output writing in and reading out signals for the field memory 8 to the memory control circuit 7. The microcomputer also includes, a data memory 33 for temporarily storing data, a timer 34 having a timer function and a timer memory, a microprocessor 35 for conducting an operation, and a program memory 32 for controlling the operation instructions. Thus, a reproduced signal detection means for measuring the period in which the signal recorded on the video tape 1 is reproduced during two field periods is configured by the microcomputer 30 and the comparator 6. A means for conducting a predicting operation of the period in which the reproduced signal is larger than a desired level from the measured result is also embodied by the microcomputer 30. Further, a means for controlling the timing for the writing in and reading out into the field memory 8 of the reproduced signal is implemented by the microcomputer 30 and the memory control circuit 7. The D/A converter 40 comprises a circuit for establishing the level of the comparison voltage to be supplied to the comparator 6. The remaining circuitry includes the same elements as those of a conventional system and the same reference numerals designates the same elements as those of FIG. 1.

The apparatus of FIG. 8 operates as follows.

Suppose now that the video heads 2a and 2b reproduce the loci e and d of the video track 50 of FIG. 2 on the tape 1 in a reverse direction at four times normal speed. The reproduced envelopes obtained then appear as shown in FIG. 3(a) and (b), and the output from the microcomputer 30 is supplied to the comparator 6 through the D/A converter 40 thus using a constant voltage as the comparison reference voltage for the comparator 6. Herein, the constant voltage may be an arbitrary voltage, and in this embodiment approximately ¼ voltage of the maximum voltage of the reproduced envelope is supplied. The ¼ voltage is selected as a comparison reference voltage while taking into consideration the noise margin of the reproduced signal and the accumulated DC component caused by the envelope detector 5.

Figure 9:
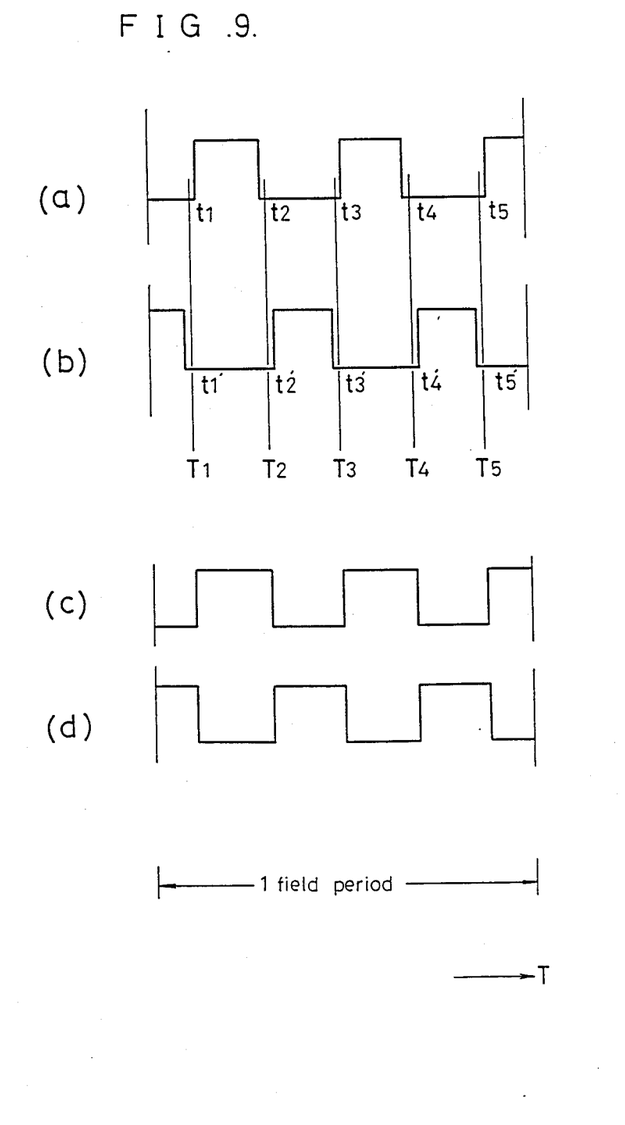

When such a voltage is supplied to the comparator 6, the two field outputs obtained from the comparator 6 appear as shown in FIG. 9(a) and (b), respectively. Herein, the logic levels of FIG. 9(a) and (b) means simply the reading out mode when the level is "H" there is no reproduced signal), and the writing mode (in when the level is "L" there is a reproduced signal) from the field memory 8, respectively. Herein, the reading out mode does not mean that the memory content is read out, but means that the memory content is not written in.

Herein, the $t_1, t_2, t_3, t_4, t_5, t_1', t_2', t_3', t_4',$ and $t_5',$ shown in FIG. 9(a) and (b) are measured over two field periods, respectively, and thereafter the following formulae are respectively calculated:

$$\frac{t_1 + t_1'}{2} = T_1, \quad \frac{t_2 + t_2'}{2} = T_2$$

$$\frac{t_3 + t_3'}{2} = T_3, \quad \frac{t_4 + t_4'}{2} = T_4, \text{ and } \frac{t_5 + t_5'}{2} = T_5$$

Figure 10:
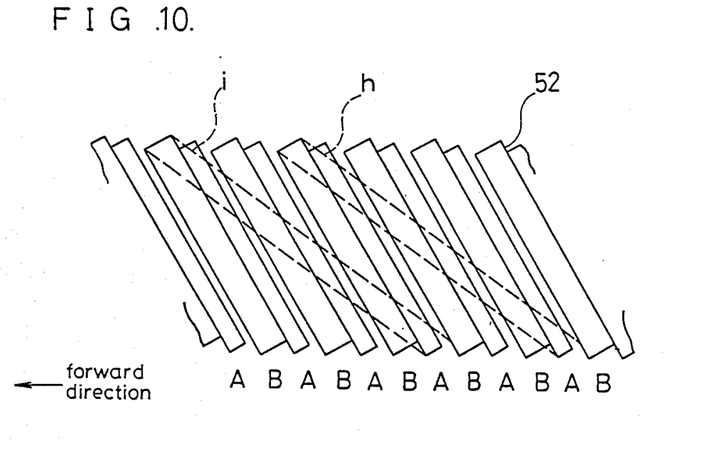
FIG. 10 is a diagram showing the head locus obtained when a video track to which the recording is performed is reproduced at a high speed with different track widths for every field.

Herein, the reference characters T1 to T4 represent the ideal switching position of the writing in and reading out from the field memory 8. That is, the writing in and reading out from the field memory 8 may be conducted at these positions, and if they are represented by waveforms at every field they appear as shown in FIG. 9(c) and (d). Thus, the above-described switching positions T1, T2, T3, T4, and T5 are calculated, and the microcomputer 30 outputs waveforms of the FIG. 9(c) and (d) to the memory control circuit 7. When such an operation is conducted, it becomes possible to perform the writing in and reading out at the optimum position even in a case where the recording track widths are different at every field as shown in FIG. 10. FIG. 10 shows a manner in which the video track 52 on the video tape 1 having the different track width at every field is traced by the video heads 2a and 2b as shown by h and i, respectively.

Figure 11:
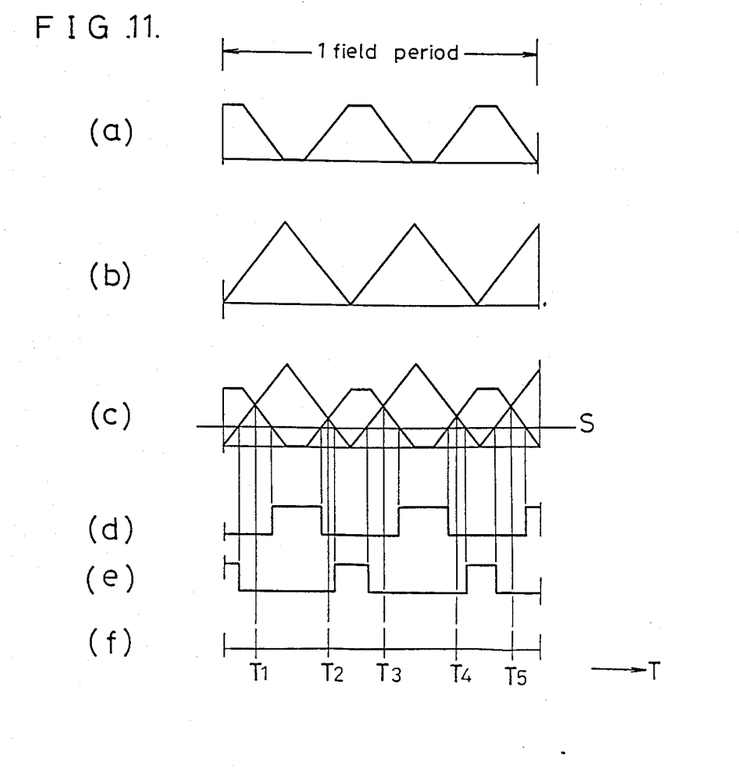

The envelope waveform at every field obtained then appear as shown in FIG. 11(a) and (b), and the composite waveform which is obtained from the two waveforms being merged on the time axis appears as shown in FIG. 11(c). Accordingly, in FIG. 11(c), when a constant level s is fed to the comparator 6 the output of the comparator 6 is as shown in FIG. 11(d) and (e), for the waveform of FIGS. 11(a) and 11(b) respectively. Again, the level "L" designates the period of writing in and the level "H" designates the period of reading out.

Therefore, intermediate points between the field transition to the level "H" of the output of the comparator 6 at every field and the field transition to the level "L" of the output of the comparator 6 at every field becomes T1, T2, T3, T4, and T5 as shown in FIG. 11(f). They are the cross points of the reproduced envelopes between the two fields at every field, and the reproduced level is the smallest one. Optimum control is conducted when this point is made a writing in point and reading out point for the field memory 8.

By using the above-described method, an optimum point of the switching of the writing in and reading out for the field memory 8 is obtained even in a case where the reproduction track widths are different for every field.

Thus, a reproduced signal whose envelope signal is smoothly continuing with interlacing at every field is written into the field memory 8, and the width of the noise bar becomes narrow, and then disappears. Furthermore, the same portions are not rewritten at every field and does not appear with a blur.

The above-described operation will be further described with reference to the flowcharts of FIGS. 12 and 13. Herein, the vertical synchronous signal is made a reference an the time axis, and the level for the vertical blanking period is made "L".

Figure 12:
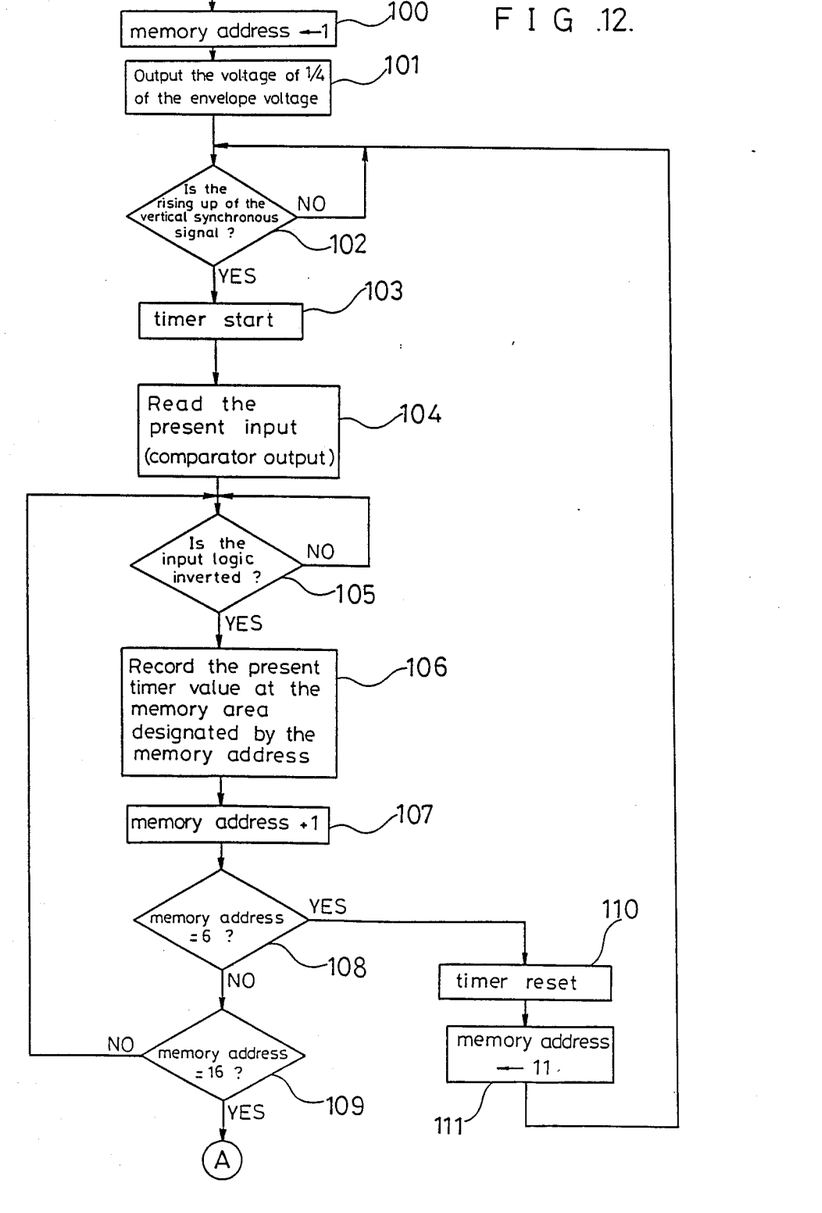
FIGS. 12 and 13 are diagrams illustrating flowcharts exemplifying the operation of the device of FIG. 8.
Figure 13:
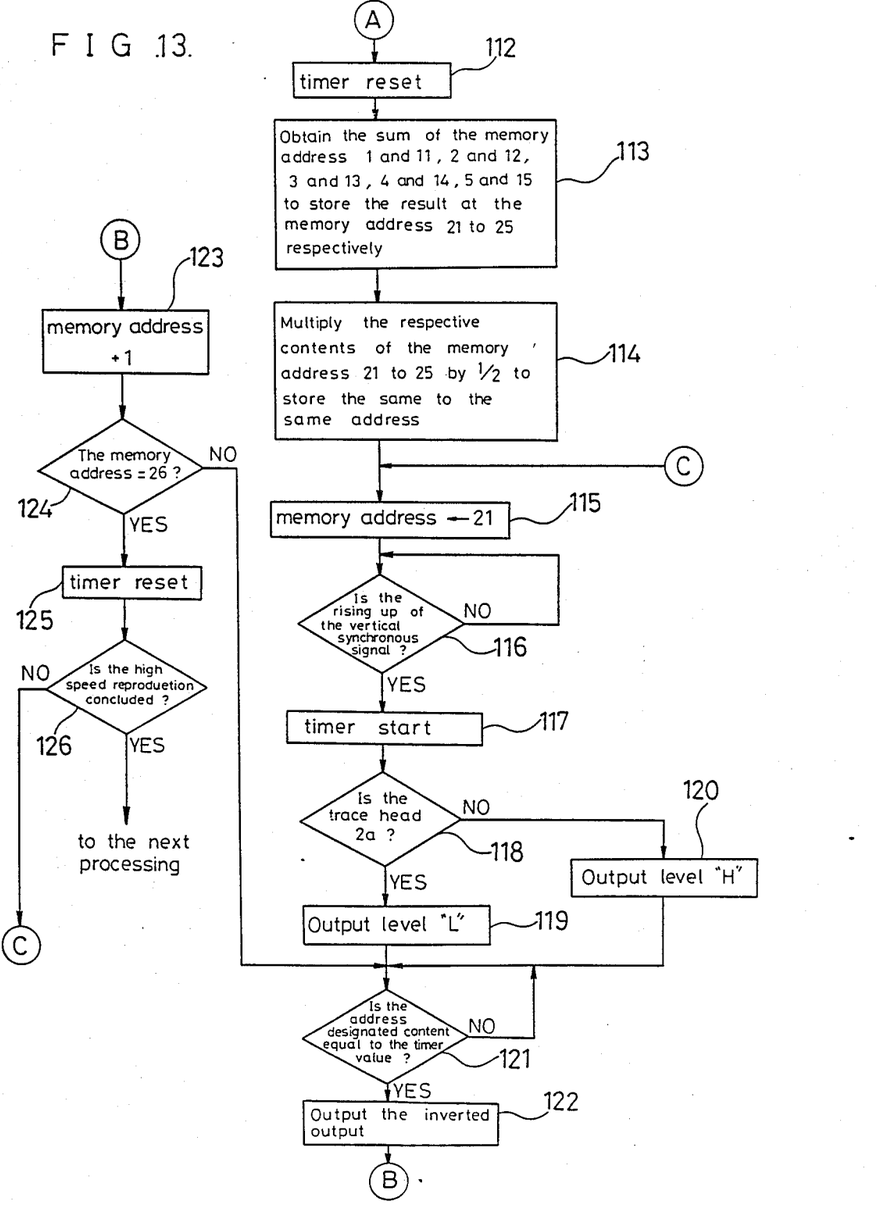

In FIG. 12, first the address of the data memory 33 in the microcomputer 30 is initialized to thereby establish the address No. 1 (step 100). Next, a voltage code is output to supply a voltage of about ¼ of the maximum voltage of the envelope detection signal to the comparator 6 through the I/O circuit 31 and the D/A converter 40. Herein, the code is represented by a binary decimal number (BCD). After performing an initial step as described above, and the rising of the vertical synchronous signal obtained from the video signal processing circuit 4 is detected (step 102), and the timer 34 in the microcomputer 30 is initialized to start (step 103). When a rise of the vertical synchronous signal is not detected, it waits until it is detected.

Now, when the rise of the vertical synchronous signal is detected and the timer 34 is started, the output from the comparator 6 is read in through the I/O circuit 31 in the microcomputer 30 (step 104). Next, it is confirmed whether the logic level of the read in input is inverted or not (step 105). If it is not inverted it waits until it is inverted. If it is inverted, the timer value at present of the timer 34 is stored at a memory area designated by the memory address (step 106).

Next, the memory address is advanced by +1 (step 107), and it is confirmed as to whether or not the memory address value is equal to 6 (step 108). If it is equal to 6, the time in the timer 34 is reset (step 110), and the memory address value is advanced to 11 (step 111), and the step returns to the step 102 for the measurement of the next field, and it waits until the rise of the vertical synchronous signal.

Herein, the memory address value "6" at the step 108 means the following: There are 5 points of $t_1$ to $t_5$, $t_1'$ to $t_5'$ where the logic level is inverted at every field, the timer value at these points are recorded at the corresponding memory areas, and the measurement for one field is completed concluded when the memory address value become "6".

Next, it is determined whether the memory address value is equal to 16 or not (step 109). If not, it means that a measurement is going on, and the step returns to the step 105 to continue the measurement. Herewith the memory address value "16" has the same meaning as described above, i.e. The memory address value "16" means that the second field measurement is completed.

As described above, when the two field measurements are concluded the timer in the timer 34 is reset (step 112). And then, the sum of the memory contents between the fields which are obtained from the measurement is obtained (step 113). That is, the sum of the contents of the memory address No. 1 and No. 11, similarly No. 2 and No. 12, No. 3 and No. 13, No. 4 and No. 14, No. 5 and No. 15 are obtained, and the respective results are stored at a new memory address Nos. 21 to 25, respectively. Then, the contents of the respective address of memory addresses Nos. 21 to 25 are respectively halved, and the respective result is again recorded at the same address (step 114). At this point the switching point of the writing in and the reading out into the field memory 8 is predicted.

Subsequently, execution is conducted on the basis of the result obtained by the above-described operation. The memory address is re-established at 21 (step 115), and the rise of the vertical synchronous signal is detected (step 116). If it is not detected it waits until it is detected. If it is detected the timer 34 is cleared to start (step 117). Herein, it is determined whether the trace head is 2a or 2b (step 118). Then, if the trace head is 2a, at first the level "L" is output as shown in FIG. 9(a) (step 119). Similarly as above if the trace head is 2b, the level "H" is initially output as shown in FIG. 9(b) (step 120). Thereafter, it is determined whether the content designated by the memory address is equal to the timer value of the timer 34 (step 121). If it is not it waits until it becomes equal. If it is equal the logic level of the output is inverted (step 122), and the memory address is advanced by +1 (step 123). Then, it is determined whether or not the memory address value becomes 26 (step 124). If it is not, it means that the operation within the present field is executed, and the step returns to the step 121 to continue the operation. If it is equal, the writing in and the reading out operation from the field memory 8 in one field is completed, and the timer in the timer 34 is reset (step 125), and it is determined whether the high speed reproduction mode is concluded (step 126). If it is not, the step returns to the step 115 to continue the operation. On the contrary, if the operation is concluded the step exits to the next processing interval.

In the above-illustrated embodiment a speed equal four times the normal speed reproduction is described as the high speed reproduction mode, but the present invention is not limited thereto but is applicable to any type of high speed reproduction mode where the multiple of speed is an even number.

In the above-illustrated embodiment a software driven microcomputer is used, but each of the control means can be implemented by hardware with the same effects as described above.

Furthermore, a dual-port memory (or a multi-port memory) is used when desirable as a field memory, but a general purpose memory can be used.

What is claimed is:

1. A video tape reproducing apparatus for reproducing a video signal from a magnetic tape, comprising:
    at least two video playback heads for reproducing said video signal from said magnetic tape having recording tracks arranged diagonally with respect to the running direction of said magnetic tape;
    an envelope detector for generating an envelope signal of said video signal from the output signal of said video playback heads;
    a comparator for generating and outputting a control signal by comparing the envelope signal from said envelope detector and a reference signal applied thereto;
    means for generating said reference signal and adjusting the level thereof in response to the envelope signal from said envelope detector; and
    a field memory for storing the content of said video signal in response to the control signal from said comparator, said stored content being thereafter read out to generate a reproduced video signal.

2. A video tape reproducing apparatus as defined in claim 1, wherein said video signal from said magnetic tape is reproduced at a speed equal to an even numbered multiple of the recording speed.

3. A video tape reproducing apparatus as defined in claim 1, wherein said means for generating and adjusting comprises a second envelope detector coupled to said first recited envelope detector for integrating the envelope signal therefrom and generating said reference signal, and a variable resistor coupled to said second envelope detector for adjusting the level of the reference signal.

4. A video tape reproducing apparatus for reproducing video signals from a magnetic tape comprising:
- at least two video playback heads for reproducing said video signal from said magnetic tape having recording tracks and arranged diagonally with respect to the running direction of said magnetic tape;
- an envelope detector for generating an envelope signal of said video signal from the output signal of said video playback heads;
- a comparator for generating and outputting a control signal by comparing the envelope signal from said envelope detector and a reference signal applied thereto;
- means for calculating and generating a reproduction timing signal of the video signal in accordance with said control signal from said comparator; and
- a field memory for storing said video signal in accordance with said reproduction timing signal, said stored content being thereafter read out to generate a reproduced video signal.

5. A video tape reproducing apparatus as defined in claim 4, wherein said video signal is reproduced from said magnetic tape at a speed equal to an even numbered multiple of the recording speed.

6. A video tape reproducing apparatus as defined in claim 4, wherein said comparator includes means for generating at least one binary control signal.

7. A video tape reproducing apparatus as defined in claim 6, wherein said calculating the generating means includes a microcomputer comprising, and I/O circuit, a programmed memory having stored operation procedures, a microprocessor for conducting a predetermined operation on input signals from said I/O circuit in accordance with said operation procedures, a data memory for temporarily storing input and output signals of said microprocessor, and a timer controlled by said microprocessor.

8. A video tape reproducing apparatus as defined in claim 7, wherein said microcomputer generates a digital reference signal having a level of ¼ of the maximum level of said video signal and additionally including D/A converter coupled between the I/O circuit and said comparator and wherein said digital reference signal is coupled to said D/A converter, and thereafter converted to an analog signal and applied to said comparator.

9. A video tape playback and reproducing apparatus for storing a synchronously reproduced signal in a field memory during a high reproduction speed relative to recording speed when the level of the reproduced signal is larger than a predetermined level and for reading out the stored content of said reproduced signal asynchronously, said predetermined level being generated by level setting means level establishing means comprising:
- a first envelope detector for generating an envelope signal of the reproduced signal, said reproduced signal being generated by a magnetic head traversing a recording track on a magnetic tape being played back on said apparatus;
- a second envelope detector for detecting the envelope signal of said first envelope detector and generating an output signal;
- a variable resistor connected to said output signal for adjusting the level of the output signal; and
- comparison means for comparing the envelope signal of said first envelope detector and the adjusted level of said output signal,
- whereby said predetermined level is set at an optimum level for the signal reproduced.

10. A video tape playback and reproducing apparatus for storing a synchronously reproduced signal in a field memory during a high reproduction or playback speed relative to recording speed and for reading out the stored content of said reproduced signal asynchronously from said memory and comprising:
- means for detecting the envelope of said reproduced signal;
- means for measuring the period when the envelope of a reproduced signal has a level higher than a predetermined reference level over continuous fields of video images detected when a magnetic head traverses a recorded track on magnetic tape being played back on said apparatus;
- means for predicting the cross-over point of the respective reproduced signal envelopes at each of the even and odd fields, said fields being interlaced on the time axis and generating a control signal; and
- memory control means for controlling the writing in and reading out said reproduced signal to and from said memory in response to said control signal.

* * * * *